United States Patent
Liu et al.

(10) Patent No.: US 9,526,117 B2
(45) Date of Patent: Dec. 20, 2016

(54) RANDOM ACCESS PROCESSING METHOD AND DEVICE

(71) Applicant: Huawei Technologies Co., Ltd., Shenzhen, Guangdong (CN)

(72) Inventors: Kunpeng Liu, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 14/466,037

(22) Filed: Aug. 22, 2014

(65) Prior Publication Data

US 2014/0362806 A1 Dec. 11, 2014

Related U.S. Application Data

(63) Continuation of application No. PCT/CN2013/071069, filed on Jan. 29, 2013.

(30) Foreign Application Priority Data

Feb. 23, 2012 (CN) .......................... 2012 1 0042334

(51) Int. Cl.
| | |
|---|---|
| *H04W 4/00* | (2009.01) |
| *H04W 72/00* | (2009.01) |
| *H04W 68/00* | (2009.01) |
| *H04W 74/08* | (2009.01) |
| *H04W 72/04* | (2009.01) |
| *H04W 72/14* | (2009.01) |

(52) U.S. Cl.
CPC ..... *H04W 74/0833* (2013.01); *H04W 72/0406* (2013.01); *H04W 72/14* (2013.01); *H04W 74/0866* (2013.01)

(58) Field of Classification Search
CPC ..................... H04W 74/0833; H04W 72/0406; H04W 72/14; H04W 74/0866; H04W 72/042; H04W 76/023
See application file for complete search history.

(56) References Cited

U.S. PATENT DOCUMENTS

| | | | |
|---|---|---|---|
| 2008/0139214 A1* | 6/2008 | Sun ..................... | H04W 72/042 455/450 |
| 2010/0309877 A1 | 12/2010 | Damnjanovic et al. | |
| 2011/0170503 A1 | 7/2011 | Chun et al. | |
| 2011/0243075 A1 | 10/2011 | Luo et al. | |
| 2012/0184306 A1* | 7/2012 | Zou ..................... | H04W 76/023 455/458 |

FOREIGN PATENT DOCUMENTS

| | | |
|---|---|---|
| CN | 101523930 A | 9/2009 |
| CN | 101909354 A | 12/2010 |
| CN | 102106181 A | 6/2011 |

(Continued)

*Primary Examiner* — Kiet Tang

(57) ABSTRACT

Embodiments of the present invention provide a method and a device for processing random access. The method includes: detecting a random access preamble sequence which is sent by a user equipment (UE) according to configuration information; determining a control channel corresponding to the detected random access preamble sequence, and scheduling random access response information corresponding to the random access preamble sequence by using the control channel.

15 Claims, 4 Drawing Sheets

---

Detect a random access preamble sequence which is sent by a UE according to configuration information — 101

Determine a control channel corresponding to the detected random access preamble sequence and schedule random access response information corresponding to the random access preamble sequence by using the control channel — 102

(56) References Cited

FOREIGN PATENT DOCUMENTS

| CN | 102143593 A | 8/2011 |
|----|----|----|
| CN | 102231913 A | 11/2011 |
| WO | WO 2007/078165 A1 | 7/2007 |
| WO | WO 2008/051037 A1 | 5/2008 |
| WO | WO 2010/148132 A2 | 12/2010 |
| WO | WO 2013/049768 A1 | 4/2013 |

\* cited by examiner

RANDOM ACCESS PROCESSING METHOD AND DEVICE

CROSS-REFERENCE TO RELATED APPLICATION

This application is a continuation of International Application No. PCT/CN2013/071069, filed on Jan. 29, 2013, which claims priority to Chinese Patent Application No. 201210042334.6, filed on Feb. 23, 2012, both of which are hereby incorporated by reference in their entireties.

TECHNICAL FIELD

Embodiments of the present invention relate to a communications technology, and in particular, to a random access processing method and device.

BACKGROUND

In existing long term evolution (Long Term Evolution, LTE for short below) networks, random access includes contention-based random access and non-contention-based random access.

A specific procedure of contention-based random access is that: a UE selects a sequence from a random access sequence set and sends a random access preamble (Random Access Preamble, RAP for short below) on a physical random access channel (Physical Random Access CHannel, PRACH for short below) predefined by a base station (eNodeB, eNB for short below). Random access responses (Random Access Response, RAR for short below) corresponding to RAPs sent by using a same PRACH resource are transmitted on a same physical downlink shared channel (Physical Downlink Shared CHannel, PDSCH for short below) and the PDSCH is indicated by a physical downlink control channel (Physical Downlink Control Channel, PDCCH for short below) that masks cyclic redundancy check (Cyclic Redundancy Check, CRC for short below) with a random access radio network temporary identity (Random Access Radio Network Temporary Identity, RA-RNTI for short below). Therefore, after sending the RAP, the UE may detect a PDCCH in each subframe in an RAR window. When a PDCCH scrambled with an RA-RNTI corresponding to the PRACH is detected, the UE may continue to demodulate a media access control protocol data unit (Media Access Control Protocol Data Unit, MAC PDU for short below) borne on the PDSCH indicated by the PDCCH. If a MAC header of the MAC PDU includes a MAC subheader corresponding to an RAPID, it means that the MAC PDU includes an RAR for the UE, and a random access succeeds.

In the prior art, within a cell, for a same PRACH time and frequency resource, namely a same RAPID, an eNB returns only one RAR. When two or more UEs within the cell send a same PRACH, the UEs have a low success rate of random access.

SUMMARY

Embodiments of the present invention provide a random access processing method and device.

According to a first aspect of the present invention, a random access processing method is provided, including:

detecting a random access preamble sequence which is sent by a user equipment UE according to configuration information; and determining a control channel corresponding to the detected random access preamble sequence, and scheduling random access response information corresponding to the random access preamble sequence by using the control channel.

According to a second aspect of the present invention, another random access processing method is provided, including:

sending a random access preamble sequence to a base station according to configuration information;

detecting, on a control channel corresponding to the random access preamble sequence, scheduling information of random access response information which corresponds to the random access preamble sequence; and detecting the random access response information according to the scheduling information.

According to a third aspect of the present invention, a base station is provided, including:

a sequence detecting module, configured to detect a random access preamble sequence sent by a user equipment UE according to configuration information; and a determining and scheduling module, configured to determine a control channel corresponding to a random access preamble sequence detected by the sequence detecting module, and schedule random access response information corresponding to the random access preamble sequence by using the control channel.

According to a third aspect of the present invention, a user equipment is provided, including:

a sequence sending module, configured to send a random access preamble sequence to a base station according to configuration information; and a detecting module, configured to detect, on a control channel corresponding to a random access preamble sequence sent by the sequence sending module, scheduling information of random access response information which corresponds to the random access preamble sequence, and detect the random access response information according to the scheduling information.

In the embodiments of the present invention, a base station may detect a random access preamble sequence which is sent by a UE according to configuration information. Then the base station may determine, according to the random access preamble sequence, a corresponding control channel and schedule random access response information by using the control channel. Correspondingly, the UE may detect, on the control channel corresponding to the random access preamble sequence sent by the UE, scheduling information of the corresponding random access response information, and detect the random access response information according to the scheduling information. Therefore, even if the base station receives a same PRACH which is sent by different UEs by using a same random access preamble sequence, the base station can still schedule the random access response information by using as many different types of PDCCHs as possible to avoid the problem that only one UE can receive an RAR, thereby improving the success rate of random access.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
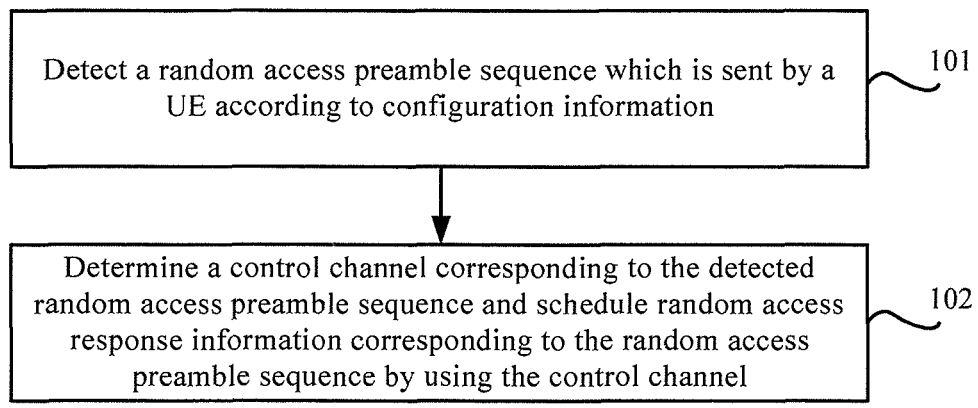
FIG. 1 is a flowchart of Embodiment 1 of a random access processing method of the present invention.

FIG. 1 is a flowchart of Embodiment 1 of a random access processing method of the present invention. As shown in FIG. 1, the method in this embodiment may include:

Step 101: Detect a random access preamble sequence which is sent by a UE according to configuration information.

Step 102: Determine a control channel corresponding to the detected random access preamble sequence and schedule random access response information corresponding to the random access preamble sequence by using the control channel.

Specifically, in the prior art, within a cell, for a same PRACH time and frequency resource, namely a same RAPID, an eNB returns only one RAR on one PDCCH. When two or more UEs within the cell send a same PRACH, only one UE can decode an RAR on the PRACH while other UEs cannot, which results in a low success rate of random access for the UEs.

The inventor finds through research that an eNB may distinguish UEs in many ways. For example, an eNB may distinguish different UEs within a cell based on different time and frequency resources used by the UEs, or distinguish UEs that send signals through different coordinated nodes in the case of multi-node coordination, or distinguish different UEs based on distances between the eNB and the UEs. However, even if the eNB can distinguish the UEs, the eNB can return only one RAR on a same PDCCH as long as these UEs use the same PRACH.

Therefore, to solve the foregoing problem, in this embodiment, different types of PDCCHs need to be used to schedule the random access response information so that RARs are scheduled on as many different PDCCHs as possible for random access performed by multiple UEs using a same PRACH resource. In this way, the problem that only one UE can receive an RAR is avoided and the success rate of random access is improved.

The inventor finds through further research that UEs within a cell may be UEs of different releases, for example, a legacy UE that complies with LTE standard R8, R9, or R10, a new-release UE that complies with LTE standard R11, or a UE of a more advanced release in the future. As stipulated in current standards, downlink control signal for a legacy UE may be scheduled by using PDCCH. For a new-release UE, for example, a UE compliant with LTE standard R11, however, on the basis of using PDCCHs, an eNB may also use enhanced PDCCHs (E-PDCCH for short below) to schedule downlink control signals. For a UE of a possibly more advanced release in the future, a standard may also specify that downlink control signals are scheduled by using other types of PDCCHs. Therefore, in this embodiment, RARs may be scheduled by using different types of PDCCHs based on attribute information of different UEs such as releases of different UEs. In the prior art, however, an eNB cannot know attribute information of a UE that sends a signal, for example, the release of the UE, and therefore cannot select an appropriate PDCCH.

Therefore, in this embodiment, a base station may notify a UE in advance of configuration information corresponding to the UE. The configuration information may include a random access preamble sequence used by the UE. The base station may configure random access preamble sequences for UEs of different releases. The configuration information enables an eNB to identify, to the greatest extent, attributes of the UE that sends a signal, for example, the release of the UE.

For example, for all random access preamble sequences available within a cell, the base station may configure in advance some of the random access preamble sequences for legacy UEs and some for UEs of advanced releases, or all the random access preamble sequences may be grouped into three parts, in which part 1 sequences are used by legacy UEs, part 3 sequences are used by UEs of advanced releases, and part 2 sequences are an overlap of part 1 and part 3 sequences, that is, sequences that may be used by both legacy UEs and UEs of advanced releases. It should be noted that this embodiment does not limit the grouping of random access preamble sequences to the above method. Persons skilled in the art may understand that the configuration information is only required to enable a base station to differentiate, to the greatest extent, attribute information of different UEs.

After acquiring the configuration information, a UE may use a random access preamble sequence in the configuration information for random access. Specifically, the UE may select a random access preamble sequence from the configuration information and send, on a PRACH resource, the random access preamble sequence to an eNB.

Correspondingly, the eNB may detect the random access preamble sequence which is sent by the UE according to the configuration information corresponding to the UE. Then the eNB may determine a corresponding control channel according to the random access preamble sequence. It is still used as an example that all random access preamble sequences are grouped into two parts: a first sequence group and a second sequence group, where legacy UEs use the first sequence group and UEs of advanced releases use the second sequence group. If the eNB determines that a received random access preamble sequence is a sequence in the first sequence group, the eNB may determine that the UE is a legacy UE and may schedule an RAR by using a PDCCH. If the eNB determines that a received random access preamble sequence is a sequence in the second sequence group, the eNB may determine that the UE is a UE of an advanced release, for example, a UE of release R11, and not only may schedule an RAR by using a PDCCH but also may schedule an RAR by using an E-PDCCH. Therefore, even if the eNB receives a same PRACH which is sent by different UEs by using the same random access preamble sequence, the eNB may still schedule RARs by using as many different types of PDCCHs as possible to avoid the problem that only one UE can receive an RAR, thereby improving the success rate of random access. It should be noted that an eNB may notify a UE in advance of a resource location of an E-PDCCH or agree on a fixed resource location of the E-PDCCH with a UE so that the UE can know the resource location of the E-PDCCH and detect scheduling information of an RAR at the resource location.

In this embodiment, a base station may detect a random access preamble sequence which is sent by a UE according to configuration information. Then the base station may determine, according to the random access preamble sequence, a corresponding control channel and schedule random access response information by using the control channel. Correspondingly, the UE may detect, on the control channel corresponding to the random access preamble sequence sent by the UE, scheduling information of the corresponding random access response information, and detect the random access response information according to the scheduling information. Therefore, even if the base station receives a same PRACH which is sent by different UEs by using a same random access preamble sequence, the base station can still schedule the random access response information by using as many different types of PDCCHs as possible to avoid the problem that only one UE can receive an RAR, thereby improving the success rate of random access.

In specific implementation, all the random access preamble sequences within the cell may be grouped into a first sequence group and a second sequence group. Optionally, the first sequence group and the second sequence group may also have an overlap which is referred to as a third sequence group, where the first sequence group is used by a UE that does not support a second control channel, the second sequence group is used by a UE that supports both a first control channel and the second control channel, and the third sequence group is a sequence group formed by sequences included in both the first sequence group and the second sequence group, which means that the third sequence group can be used by both a UE that does not support the second control channel and a UE that supports both the first control channel and the second control channel. It should be noted that the first control channel may be a PDCCH and the second control channel is an E-PDCCH, or the first control channel is a control channel that includes a first downlink control information (Downlink Control Information, DCI for short below) format and the second control channel is a control channel that includes a second DCI format.

Correspondingly, a base station may send the preceding configuration information of random access preamble sequences with respect to different UEs to a UE so that the UE can perform random access only by using a random access preamble sequence notified by the base station.

In another embodiment of the random access processing method of the present invention, for a random access preamble sequence sent by a UE, a base station may use the following technical solutions for processing:

1. If the random access preamble sequence is a sequence in the first sequence group, determine that the random access preamble sequence corresponds to the first control channel, and schedule the random access response information by using the first control channel.

Specifically, if the base station determines that the random access preamble sequence is a sequence in the first sequence group, the base station may know that the UE sending the random access preamble sequence is a legacy UE and may determine that an RAR needs to be scheduled by using a PDCCH.

2. If the random access preamble sequence is a sequence in the second sequence group, determine that the random access preamble sequence corresponds to the second control channel, and schedule the random access response information by using the second control channel.

Specifically, if the base station determines that the random access preamble sequence is a sequence in the second sequence group, the base station may know that the UE sending the random access preamble sequence is a UE of an advanced release and the base station may, for example, schedule an RAR by using an E-PDCCH.

3. If the random access preamble sequence is a sequence in the third sequence group, determine that the random access preamble sequence corresponds to the first control channel or the second control channel, and schedule random access response information by using the first control channel or the second control channel.

Specifically, if the base station determines that the random access preamble sequence is a sequence in the third sequence group, the base station may fail to know whether the UE sending the random access preamble sequence is a legacy UE or a UE of an advanced release, and may perform scheduling by using a PDCCH or an E-PDCCH. Preferably, the base station may know whether a case where multiple UEs use one PRACH exists. If yes, the base station schedules an RAR by using the E-PDCCH; and if not, the base station may schedule the RAR by using the PDCCH.

Figure 2:
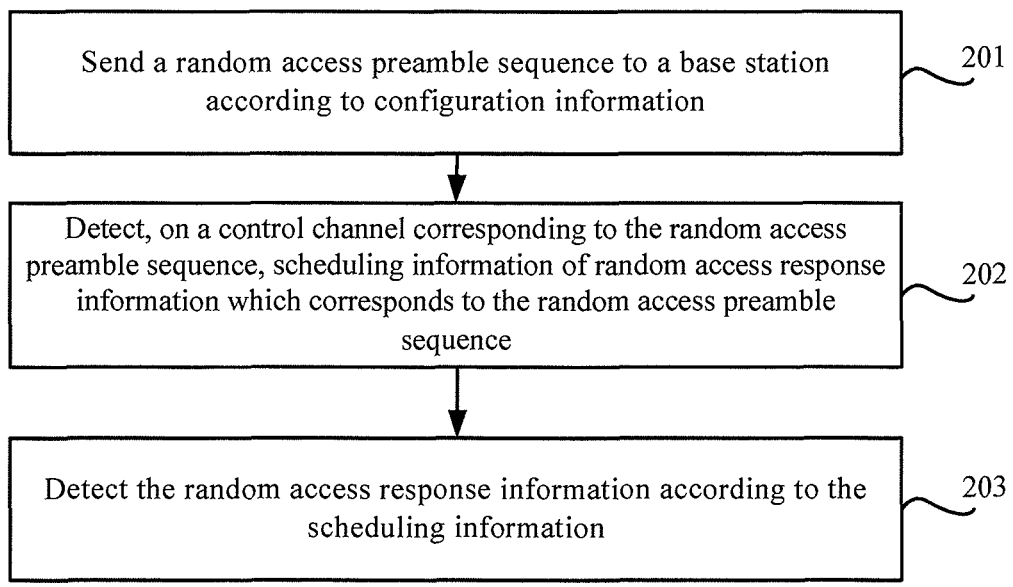
FIG. 2 is a flowchart of Embodiment 2 of the random access processing method of the present invention.

FIG. 2 is a flowchart of Embodiment 2 of the random access processing method of the present invention. As shown in FIG. 2, the method in this embodiment may include:

Step 201: Send a random access preamble sequence to a base station according to configuration information.

Step 202: Detect, on a control channel corresponding to the random access preamble sequence, scheduling information of random access response information which corresponds to the random access preamble sequence.

Step 203: Detect the random access response information according to the scheduling information.

This embodiment is a technical solution which is implemented on a UE side and corresponds to the method embodiment illustrated in FIG. 1.

Specifically, with respect to different UEs, a base station may notify a UE in advance of configuration information corresponding to the UE. The configuration information may include a random access preamble sequence used by the UE. The base station may configure random access preamble sequences for UEs of different releases. The configuration information enables an eNB to identify, to the greatest extent, attributes of the UE that sends a signal, for example, the release of the UE.

For example, for all random access preamble sequences available within a cell, the base station may configure in advance some of the random access preamble sequences for legacy UEs and some for UEs of advanced releases, or all the random access preamble sequences may be grouped into three parts, in which part 1 sequences are used by legacy UEs, part 3 sequences are used by UEs of advanced releases, and part 2 sequences are an overlap of part 1 and part 3 sequences, that is, sequences that may be used by both legacy UEs and UEs of advanced releases. It should be noted that this embodiment does not limit the grouping of random access preamble sequences to the above method. Persons skilled in the art may understand that the configuration information is only required to enable a base station to differentiate, to the greatest extent, attribute information of different UEs.

After acquiring the configuration information, a UE may use a random access preamble sequence in the configuration information for random access. Specifically, the UE may select a random access preamble sequence from the configuration information and send, on a PRACH resource, the random access preamble sequence to an eNB.

Correspondingly, the eNB may detect the random access preamble sequence which is sent by the UE according to the configuration information corresponding to the UE. Then the eNB may determine a corresponding control channel according to the random access preamble sequence. It is still used as an example that all random access preamble sequences are grouped into two parts: a first sequence group and a second sequence group, where legacy UEs use the first sequence group and UEs of advanced releases use the second sequence group. If the eNB determines that a received random access preamble sequence is a sequence in the first sequence group, the eNB may determine that the UE is a legacy UE and may schedule an RAR by using a PDCCH. If the eNB determines that a received random access preamble sequence is a sequence in the second sequence group, the eNB may determine that the UE is a UE of an advanced release, for example, a UE of release R11 and not only may schedule an RAR by using a PDCCH but also may schedule an RAR by using an E-PDCCH.

Then the UE may detect, on a control channel corresponding to the random access preamble sequence sent by the UE, the scheduling information of the random access response information which corresponds to the random access preamble sequence. For example, if the UE is a legacy UE, it may detect, on a PDCCH, the scheduling information of the random access response information. If the UE is a UE of an advanced release, it may detect, on a PDCCH, an E-PDCCH, or a control channel in a DCI format, the scheduling information of the random access response information. Therefore, even if the eNB receives a same PRACH which is sent by different UEs by using a same random access preamble sequence, the eNB may still schedule RARs by using as many different types of PDCCHs as possible and the UE may detect, on a control channel corresponding to the random access preamble sequence sent by the UE, the scheduling information of the random access response information, so that the problem that only one UE can receive an RAR is avoided and the success rate of random access is improved. Finally, the UE may detect an RAR on a data channel according to the scheduling information.

In this embodiment, a UE may select a random access preamble sequence from predefined configuration information for random access, and a base station may detect a random access preamble sequence which is sent by the UE according to configuration information corresponding to the UE. Then the base station may determine, according to the random access preamble sequence, a corresponding control channel and schedule an RAR by using the control channel.

The UE may detect, on the control channel corresponding to the random access preamble sequence sent by the UE, scheduling information of the corresponding random access response information, and detect the random access response information according to the scheduling information. Therefore, even if the base station receives a same PRACH which is sent by different UEs by using a same random access preamble sequence, the base station can still schedule the random access response information by using as many different types of PDCCHs as possible and the UEs can detect the scheduling information on a control channel corresponding to the random access preamble sequence sent by the UE, so that the problem that only one UE can receive an RAR is avoided and the success rate of random access is improved.

In specific implementation, all the random access preamble sequences within the cell may be grouped into a first sequence group and a second sequence group. Optionally, the first sequence group and the second sequence group may also have an overlap which is referred to as a third sequence group, where the first sequence group is used by a UE that does not support a second control channel, the second sequence group is used by a UE that supports both a first control channel and the second control channel, and the third sequence group is a sequence group formed by sequences included in both the first sequence group and the second sequence group, that is, the third sequence group is used by both a UE that does not support the second control channel and a UE that supports both the first control channel and the second control channel. It should be noted that the first control channel may be a PDCCH and the second control channel is an E-PDCCH, or the first control channel is a control channel that includes a first DCI format and the second control channel is a control channel that includes a second DCI format.

Correspondingly, a base station may send the preceding configuration information of random access preamble sequences with respect to different UEs to a UE so that the UE can perform random access only by using a random access preamble sequence notified by the base station.

In another embodiment of the random access processing method of the present invention, the process in which a UE performs random access processing by using configuration information sent by a base station may be implemented by using one of the following technical solutions:

1. If the selected random access preamble sequence is a sequence in the first sequence group, detect, on a first control channel corresponding to the random access preamble sequence, scheduling information of random access response information.

Specifically, if the base station determines that the random access preamble sequence is a sequence in the first sequence group, the base station may know that the UE sending the random access preamble sequence is a legacy UE and may determine that an RAR needs to be scheduled by using a PDCCH. Correspondingly, the UE may also detect scheduling information of an RAR on the PDCCH.

2. If the selected random access preamble sequence is a sequence in the second sequence group, detect, on a second control channel corresponding to the random access preamble sequence, scheduling information of random access response information.

Specifically, if the base station determines that the random access preamble sequence is a sequence in the second sequence group, the base station may know that the UE sending the random access preamble sequence is a UE of an advanced release and may schedule an RAR by using an E-PDCCH. The UE may detect scheduling information of the RAR on the E-PDCCH.

3. If the selected random access preamble sequence is a sequence in the third sequence group, detect, on the first control channel or second control channel corresponding to the random access preamble sequence, the scheduling information of the random access response information.

Specifically, if the base station determines that the random access preamble sequence is a sequence in a third sequence group, the base station may fail to know whether the UE sending the random access preamble sequence is a legacy UE or a UE of an advanced release and may perform scheduling by using a PDCCH or an E-PDCCH. Correspondingly, the UE may detect scheduling information of an RAR on the PDCCH or E-PDCCH. Preferably, the base station may know whether a case where multiple UEs use one PRACH exists. If yes, the base station schedules an RAR by using the E-PDCCH; and if not, the base station may schedule the RAR by using the PDCCH. Correspondingly, the UE may detect scheduling information of the RAR preferably on the PDCCH, and detect it then on the E-PDCCH if no RAR scheduling information is detected on the PDCCH.

The following uses a specific embodiment to describe in detail Embodiment 3 of the random access processing method of the present invention.

Figure 3:
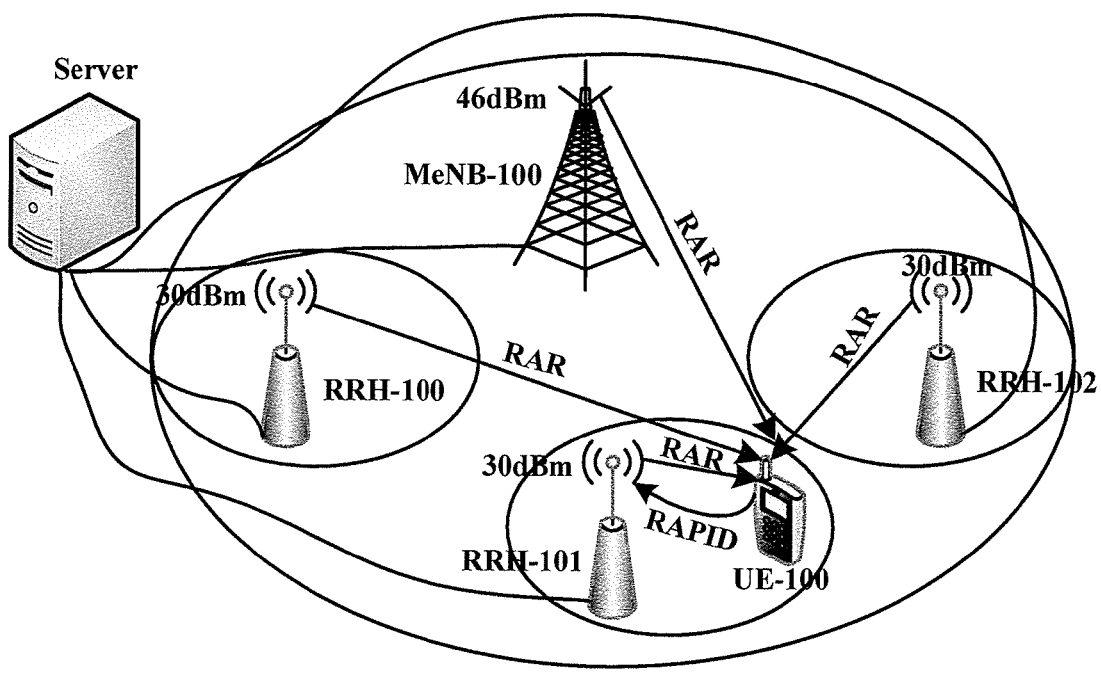
FIG. 3 is a schematic diagram of an application scenario of Embodiment 3 of the random access processing method of the present invention.

FIG. 3 is a schematic diagram of an application scenario of Embodiment 3 of the random access processing method of the present invention. As shown in FIG. 3, an existing 3rd Generation Partnership Project (3rd Generation Partnership Project, 3GPP for short below) protocol defines a coordinated multi-point transmission (Coordinated Multi-Point Transmission, CoMP for short below) scenario in which a macro site region includes a macro site (Macro Site for short below) and a radio remote unit (Radio Remote Head, RRH for short below) and these nodes share a same cell ID. The structure is also called a distributed antenna system (Distributed Antenna System, DAS for short below). In the scenario, both the RRH and the Macro Site can receive PRACHs sent by UEs within the cell, and the RRH may aggregate signals sent by the UEs at the Macro Site. Therefore, the Macro Site can know whether all UEs within the cell have sent a same PRACH, that is, whether a problem of RAR collision exists.

Figure 4:
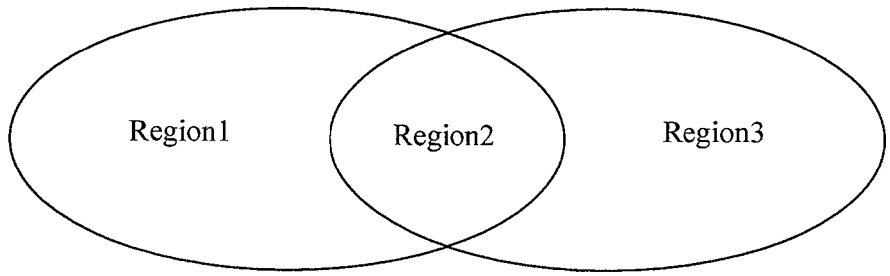
FIG. 4 is a schematic structural diagram of sequence grouping used in Embodiment 3 of the random access processing method of the present invention.

In the scenario, a base station may notify by broadcasting in advance two sequence groups: the first sequence group and the second sequence group, where the two sequence groups may have an overlap serving as a third sequence group. FIG. 4 is a schematic structural diagram illustrating the grouping of sequence groups used in Embodiment 3 of the random access processing method of the present invention. As shown in FIG. 4, the first sequence group includes sequences included by region 1 and region 2, the second sequence group includes sequences included by region 2 and region 3, and the third sequence group is represented by region 2. Upon random access, a legacy UE may randomly select a random access preamble sequence from a sequence group of region 1 and region 2 and send it for uplink random access. A UE of an advanced release may randomly select a random access preamble sequence from a sequence group of region 2 and region 3 and send it for uplink random access.

The following description is given based on three conditions:

1. If the Macro Site detects that a random access preamble sequence sent by a UE is from region 1, a PDCCH is used for RAR scheduling.

2. If the Macro Site detects a same random access preamble sequence in region 3 at multiple RRHs, the RRHs may perform RAR scheduling on their respective E-PDCCHs.

3. If the Macro Site detects a same random access preamble sequence in region 2 at multiple RRHs, RAR scheduling is performed randomly on PDCCHs or E-PDCCHs. Preferably, RAR scheduling may be performed on PDCCHs if it is ensured that RAR collision does not occur, or RAR scheduling may be performed on E-PDCCHs if RAR collision occurs.

Correspondingly, if a UE is a legacy UE, the UE needs to detect scheduling information of an RAR on a PDCCH. If a UE is of an advanced release and the selected random access preamble sequence belongs to region 3, the UE needs to detect scheduling information of an RAR on an E-PDCCH. If a UE is of an advanced release and the selected random access preamble sequence belongs to region 2, the UE needs to detect scheduling information of an RAR on a PDCCH or an E-PDCCH. Alternatively, a UE may preferably detect scheduling information of an RAR on a PDCCH; if the scheduling information of the RAR is not detected on the PDCCH, detect it on an E-PDCCH.

It should be noted that this embodiment is not limited to the preceding application scenario but applicable to any scenarios where different UEs can be distinguished.

In this embodiment, a base station may configure different sequence groups for legacy UEs and UEs of advanced releases, so that the base station may perform corresponding RAR scheduling by using different PDCCHs after legacy UEs and UEs of advanced releases perform random access by using random access preamble sequences in their respective sequence groups. Particularly, when multiple UEs of advanced releases use a same random access preamble sequence, in this embodiment, RARs from different UEs may be scheduled by using E-PDCCHs, thereby avoiding the problem of RAR collision. Therefore, even if the base station receives a same PRACH which is sent by different UEs by using the same random access preamble sequence, the base station can still schedule RARs by using as many different types of PDCCHs as possible to avoid the problem that only one UE can receive an RAR, thereby improving the success rate of random access.

Figure 5:
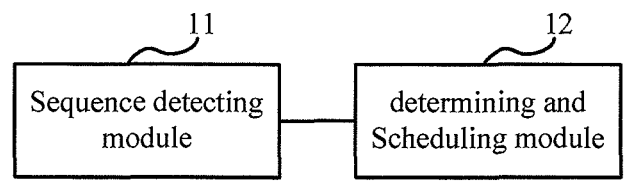
FIG. 5 is a schematic structural diagram of Embodiment 1 of a base station of the present invention.

FIG. 5 is a schematic structural diagram of Embodiment 1 of a base station of the present invention. As shown in FIG. 5, the base station in this embodiment includes a sequence detecting module 11 and a determining and scheduling module 12. The sequence detecting module 11 is configured to detect a random access preamble sequence which is sent by a UE according to configuration information; and the determining and scheduling module 12 is configured to determine a control channel corresponding to the random access preamble sequence detected by the sequence detecting module and schedule random access response information by using the control channel.

The base station in this embodiment is configured to implement the method of the method embodiment illustrated in FIG. 1. Since the implementation principles and technical effects are similar, the details are not further described herein.

Figure 6:
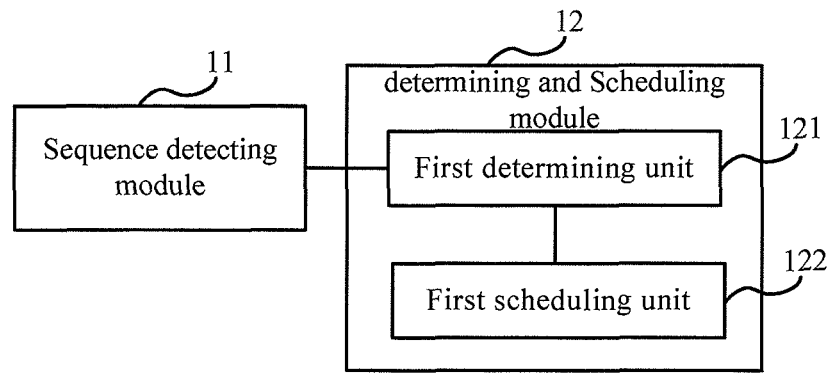
FIG. 6 is a schematic structural diagram of Embodiment 2 of the base station of the present invention.

FIG. 6 is a schematic structural diagram of Embodiment 2 of the base station of the present invention. As shown in FIG. 6, the base station in this embodiment is based on that illustrated in FIG. 5. Further, the determining and scheduling module 12 may include a first determining unit 121 and a first scheduling unit 122. The first determining unit 121 is configured to: if the random access preamble sequence is a sequence in a first sequence group, where the first sequence group is a sequence group used by a UE that does not support a second control channel, determine that the random access preamble sequence corresponds to a first control channel. The first scheduling unit 122 is configured to schedule random access response information by using the first control channel determined by the first determining unit 121.

Figure 7:
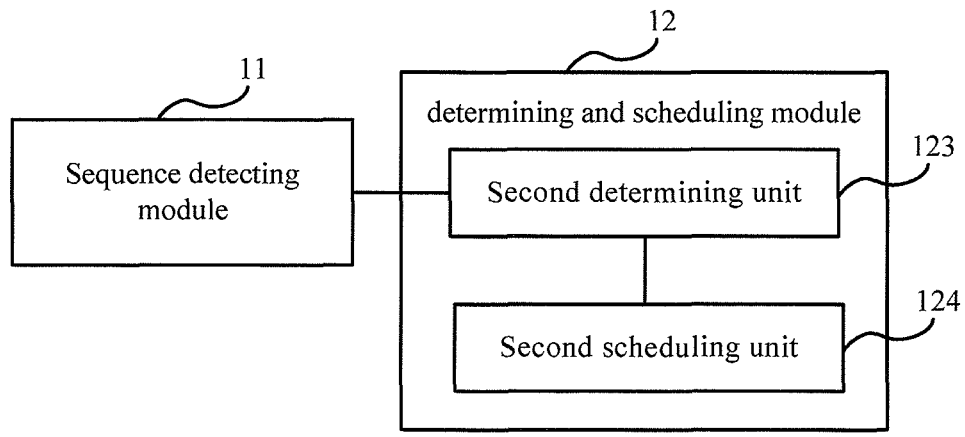
FIG. 7 is a schematic structural diagram of Embodiment 3 of the base station of the present invention.

FIG. 7 is a schematic structural diagram of Embodiment 3 of the base station of the present invention. As shown in FIG. 7, the base station in this embodiment is based on that illustrated in FIG. 5. Further, the determining and scheduling module 12 may include a second determining unit 123 and a second scheduling unit 124. The second determining unit 123 is configured to: if the random access preamble sequence is a sequence in a second sequence group, where the second sequence group is a sequence group used by a UE that supports both a first control channel and a second control channel, determine that the random access preamble sequence corresponds to the second control channel. The second scheduling unit 124 is configured to schedule random access response information by using the second control channel determined by the second determining unit 123.

Figure 8:
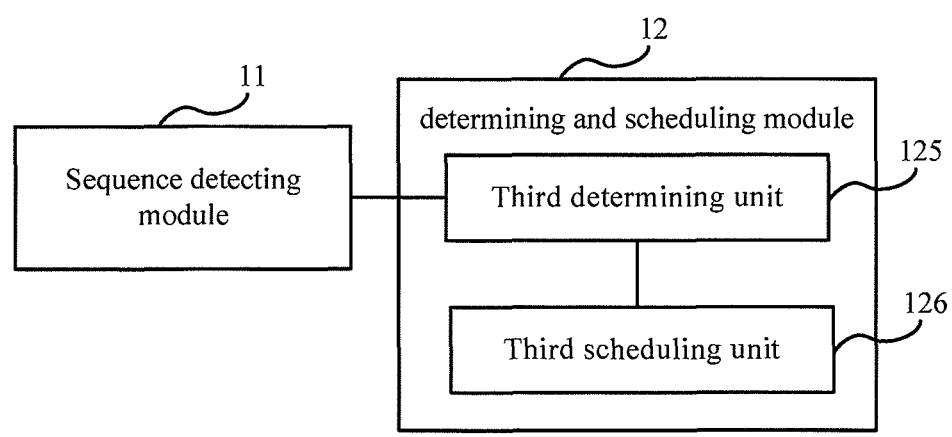
FIG. 8 is a schematic structural diagram of Embodiment 4 of the base station of the present invention.

FIG. 8 is a schematic structural diagram of Embodiment 4 of the base station of the present invention. As shown in FIG. 8, the base station in this embodiment is based on that illustrated in FIG. 5. Further, the determining and scheduling module 12 may include a third determining unit 125 and a third scheduling unit 126. The third determining unit 125 is configured to: if the random access preamble sequence is a sequence in a third sequence group, determine that the random access preamble sequence corresponds to a first control channel or a second control channel, where the third sequence group is a sequence group formed by sequences included in both a first sequence group and a second sequence group, where the first sequence group is a sequence group used by a UE that does not support the second control channel and the second sequence is a sequence group used by a UE that supports both the first control channel and the second control channel. The third scheduling unit 126 is configured to schedule random access response information by using the first control channel or the second control channel determined by the third determining unit 125.

In Embodiment 2 to Embodiment 4 of the base station of the present invention, the first control channel is a PDCCH and the second control channel is an E-PDCCH; or the first control channel is a control channel that includes a first DCI format and the second control channel is a control channel that includes a second DCI format. Embodiment 2 to Embodiment 4 of the base station of the present invention are used respectively to implement the three processing methods corresponding to the three sequence groups in Embodiment 1 of the method, and specifically, may implement the technical solution of Embodiment 3 of the random access processing method of the present invention. Since the implementation principles and technical effects are similar, the details are not further described herein.

Figure 9:
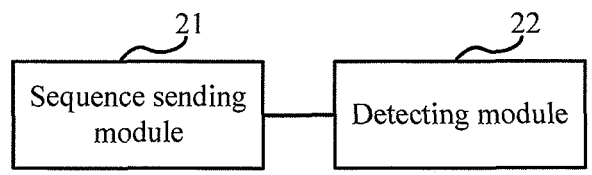
FIG. 9 is a schematic structural diagram of an embodiment of a user equipment of the present invention.

FIG. 9 is a schematic structural diagram of an embodiment of a user equipment of the present invention. As shown in FIG. 9, a UE in this embodiment may include a sequence sending module 21 and a detecting module 22. The sequence sending module 21 is configured to send a random access preamble sequence to a base station according to configuration information. The detecting module 22 is configured to detect, on a control channel corresponding to the random access preamble sequence sent by the sequence sending module 21, scheduling information of random access response information which corresponds to the random access preamble sequence, and detect the random access response information according to the scheduling information.

The UE in this embodiment is configured to implement the method of the method embodiment illustrated in FIG. 1. Since the implementation principles and technical effects are similar, the details are not further described herein.

Further, if the random access preamble sequence is a sequence in a first sequence group, where the first sequence group is a sequence group used by a UE that does not support a second control channel, the detecting module 22 is specifically configured to detect, on the first control channel corresponding to the random access preamble sequence, the scheduling information of random access response information.

If the random access preamble sequence is a sequence in a second sequence group, where the second sequence group is a sequence group used by a UE that supports both the first control channel and the second control channel, the detecting module 22 is specifically configured to detect, on the second control channel corresponding to the random access preamble sequence, the scheduling information of the random access response information.

If the random access preamble sequence is a sequence in a third sequence group, where the third sequence group is a sequence group formed by sequences included in both a first sequence group and a second sequence group, where the first sequence group is a sequence group used by a UE that does not support the second control channel and the second sequence group is a sequence group used by a UE that supports both the first control channel and the second control channel, the detecting module 22 is specifically configured to detect, on the first control channel or the second control channel corresponding to the random access preamble sequence, the scheduling information of the random access response information.

In the preceding three technical solutions, the first control channel is a PDCCH and the second control channel is an E-PDCCH; or the first control channel is a control channel that includes a first DCI format and the second control channel is a control channel that includes a second DCI format. The UEs in the preceding three technical solutions are configured respectively to implement the three processing methods corresponding to the three sequence groups in Embodiment 2 of the method, and specifically, may implement the technical solution of Embodiment 3 of the random access processing method of the present invention. Since the implementation principles and technical effects are similar, the details are not further described herein.

Persons of ordinary skill in the art may understand that, all or a part of the steps of the foregoing method embodiments may be implemented by a program instructing relevant hardware. The aforementioned program may be stored in a computer readable storage medium. When the program runs, the steps of the forgoing method embodiments are performed. The foregoing storage medium includes various mediums capable of storing program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present invention.

What is claimed is:

1. A random access processing method, comprising:
detecting a random access preamble sequence sent by a user equipment (UE) according to configuration information; and
determining a control channel corresponding to the detected random access preamble sequence, including, if the random access preamble sequence is a sequence in a second sequence group, determining that the random access preamble sequence corresponds to a second control channel, wherein the second sequence group is a sequence group used by a UE that supports both a first control channel and the second control channel; and
scheduling random access response information corresponding to the random access preamble sequence by using the second control channel.

2. A random access processing method, comprising:
detecting a random access preamble sequence sent by a user equipment (UE) according to configuration information, including, when the random access preamble sequence is a sequence in a first sequence group, wherein the first sequence group is a sequence group used by a UE that does not support a second control channel, determining that the random access preamble sequence corresponds to a first control channel;
determining a control channel corresponding to the detected random access preamble sequence; and
scheduling random access response information corresponding to the random access preamble sequence by using the first control channel.

3. The method according to claim 1, wherein:
determining the control channel corresponding to the random access preamble sequence comprises:
if the random access preamble sequence is a sequence in a third sequence group, wherein the third sequence group is a sequence group formed by sequences comprised in both a first sequence group and the second sequence group, wherein the first sequence group is a sequence group used by a UE that does not support the second control channel, and the second sequence group is a sequence group used by a UE that supports both the first control channel and the second control channel, determining that, the random access preamble sequence corresponds to the first control channel or the second control channel; and
scheduling random access response information by using the control channel comprises:
scheduling the random access response information by using the first control channel or the second control channel.

4. The method according to claim 1, wherein before detecting the random access preamble sequence which is sent by the UE according to configuration information, the method further comprises:
sending the configuration information to the UE, wherein the configuration information comprises the random access preamble sequence that can be used by the UE.

5. A random access processing method, comprising:
sending a random access preamble sequence to a base station according to configuration information;
detecting, on a control channel corresponding to the random access preamble sequence, scheduling information of random access response information which corresponds to the random access preamble sequence; and
detecting the random access response information according to the scheduling information, wherein if the random access preamble sequence is a sequence in a second sequence group and the second sequence group is a sequence group used by a user equipment (UE) that supports both a first control channel and a second control channel, then detecting, on a control channel corresponding to the random access preamble sequence, scheduling information of random access response information comprises:
detecting, on the second control channel corresponding to the random access preamble sequence, the scheduling information of the random access response information.

6. The method according to claim 5, wherein if the random access preamble sequence is a sequence in a first sequence group and the first sequence group is a sequence group used by a UE that does not support the second control channel, then detecting, on the control channel corresponding to the random access preamble sequence, scheduling information of random access response information comprises:
detecting, on the first control channel corresponding to the random access preamble sequence, the scheduling information of the random access response information.

7. The method according to claim 5, wherein if the random access preamble sequence is a sequence in a third sequence group, wherein the third sequence group is a sequence group formed by sequences comprised in both a first sequence group and the second sequence group, the first sequence group is a sequence group used by a UE that does not support the second control channel and the second sequence group is a sequence group used by the UE that supports both the first control channel and the second control channel, then detecting, on the control channel corresponding to the random access preamble sequence, scheduling information of random access response information comprises:
detecting, on the first control channel or the second control channel corresponding to the random access preamble sequence, the scheduling information of the random access response information.

8. The method according to claim 5, wherein before sending the random access preamble sequence to the base station according to configuration information, the method further comprises:
receiving the configuration information sent by the base station, wherein the configuration information comprises the random access preamble sequence that is available.

9. A base station, comprising:
at least one processor;
a sequence detecting module implemented by the at least one processor, configured to detect a random access preamble sequence which is sent by a user equipment (UE) according to configuration information; and
a determining and scheduling module implemented by the at least one processor, configured to determine a control channel corresponding to the random access preamble sequence detected by the sequence detecting module, and schedule random access response information corresponding to the random access preamble sequence by using the control channel, wherein the determining and scheduling module comprises a second determining unit, configured to determine that the random access preamble sequence corresponds to a second control channel when the random access preamble sequence is a sequence in a second sequence group, wherein the second sequence group is a sequence group used by a UE that supports both a first control channel and a second control channel; and a second scheduling unit, configured to schedule the random access response information by using the second control channel determined by the second determining unit.

10. The base station according to claim 9, wherein the determining and scheduling module comprises:

a first determining unit, configured to: if the random access preamble sequence is a sequence in a first sequence group, wherein the first sequence group is a sequence group used by a UE that does not support a second control channel, determine that the random access preamble sequence corresponds to the first control channel; and a first scheduling unit, configured to schedule the random access response information by using the first control channel determined by the first determining unit.

11. The base station according to claim 9, wherein the determining and scheduling module comprises:

a third determining unit, configured to: if the random access preamble sequence is a sequence in a third sequence group, wherein the third sequence group is a sequence group formed by sequences comprised in both a first sequence group and the second sequence group, wherein the first sequence group is a sequence group used by a UE that does not support the second control channel, and the second sequence group is a sequence group used by a UE that supports both the first control channel and the second control channel, determine that the random access preamble sequence corresponds to the first control channel or the second control channel; and a third scheduling unit, configured to schedule the random access response information by using the first control channel or the second control channel determined by the third determining unit.

12. A user equipment (UE), comprising:
at least one processor;
a sequence sending module implemented by the at least one processor, configured to send a random access preamble sequence to a base station according to configuration information; and a detecting module implemented by the at least one processor, configured to detect, on a control channel corresponding to the random access preamble sequence sent by the sequence sending module, scheduling information of random access response information which corresponds to the random access preamble sequence, detect the random access response information according to the scheduling information, and if the random access preamble sequence is a sequence in a second sequence group, wherein the second sequence group is a sequence group used by a UE that supports both a first control channel and a second control channel, detect, on the second control channel corresponding to the random access preamble sequence, the scheduling information of the random access response information.

13. The user equipment according to claim 12, wherein the detecting module is configured to: if the random access preamble sequence is a sequence in a first sequence group, wherein the first sequence group is a sequence group used by a UE that does not support the second control channel, detect, on the first control channel corresponding to the random access preamble sequence, the scheduling information of the random access response information.

14. The user equipment according to claim 12, wherein the detecting module is configured to: if the random access preamble sequence is a sequence in a third sequence group, wherein the third sequence group is a sequence group formed by sequences comprised in both a first sequence group and the second sequence group, wherein the first sequence group is a sequence group used by a UE that does not support the second control channel and the second sequence group is a sequence group used by a UE that supports both the first control channel and the second control channel, detect, on the first control channel or the second control channel corresponding to the random access preamble sequence, the scheduling information of the random access response information.

15. The user equipment according to claim 13, wherein the first control channel is a physical downlink control channel (PDCCH) and the second control channel is an enhanced PDCCH (E-PDCCH); or the first control channel is a control channel that comprises a first downlink control information (DCI) format and the second control channel is a control channel that comprises a second DCI format.

* * * * *